(12) United States Patent
Robertson et al.

(10) Patent No.: US 9,361,741 B2
(45) Date of Patent: *Jun. 7, 2016

(54) SYSTEM AND METHOD FOR ACCESSING A STRUCTURE USING A MOBILE DEVICE

(71) Applicant: Yikes LLC, Monticello, IN (US)

(72) Inventors: William Benjamin Robertson, Monticello, IN (US); Robert P. Barden, Valley Center, KS (US)

(73) Assignee: Yikes LLC, Monicello, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/825,263

(22) Filed: Aug. 13, 2015

(65) Prior Publication Data

US 2016/0035162 A1    Feb. 4, 2016

Related U.S. Application Data

(63) Continuation of application No. 14/307,667, filed on Jun. 18, 2014, now Pat. No. 9,129,450, which is a continuation of application No. 12/536,103, filed on Aug. 5, 2009, now Pat. No. 8,791,790, which is a continuation-in-part of application No. 12/368,601, filed on Feb. 10, 2009, now abandoned.

(51) Int. Cl.
*G05B 19/00* (2006.01)
*G07C 9/00* (2006.01)
(Continued)

(52) U.S. Cl.
CPC ........ *G07C 9/00111* (2013.01); *G07C 9/00007* (2013.01); *G07C 9/00571* (2013.01);
(Continued)

(58) Field of Classification Search
CPC .......... G07C 9/00904; G07C 9/00007; G07C 9/00111; G07C 9/00571; G07C 9/00317; G07C 2009/00793; G07C 2009/10; H04W 19/4008; H04W 12/06; H04W 12/04; H04W 12/08; H04L 47/14; G06Q 10/02; G06Q 20/32; G06Q 50/12
See application file for complete search history.

(56) References Cited

U.S. PATENT DOCUMENTS 4,401,260 A    8/1983    Grant
4,868,914 A    9/1989    Yamashita
(Continued)

FOREIGN PATENT DOCUMENTS

EP    1965595 A1    9/2008
JP    08184236 A    7/1996
(Continued)

OTHER PUBLICATIONS

Signature by VingCard—VingCard Elsafe—ASSA ABLOY—"VingCard Ouptpacing Industry in RFID/NFC Skill: Displays Electronic Lock Advancement for Remote Hotel Check-in/Check-out at IH/MRS" Paris Nov. 6, 2008—VingCard Elsafe s.a.s—37, rue Adam Ledoux—BP 46-92 404 Courbevoie Cedex

*Primary Examiner* — Kerri McNally
*Assistant Examiner* — Renee Dorsey
(74) *Attorney, Agent, or Firm* — Woodard, Emhardt, Moriarty, McNett & Henry LLP

(57) ABSTRACT

A wireless device access system employs short-range wireless communication to require the proximity of a user device to a structure prior to communicating an unlock request. The access system authenticates the unlock request and the proximity of the user to the structure prior to transmitting an unlock command to the structure. Additionally, the wireless device may require the proximity of a user token prior to operation and/or the access system may include an override within the structure blocking any unlock command.

16 Claims, 4 Drawing Sheets

(51) Int. Cl.
  *H04L 29/06* (2006.01)
  *H04W 12/06* (2009.01)
  *H04W 88/06* (2009.01)

(52) U.S. Cl.
  CPC ........ *G07C9/00904* (2013.01); *H04L 63/0876* (2013.01); *H04W 12/06* (2013.01); *G07C 2009/00793* (2013.01); *G07C 2209/64* (2013.01); *H04W 88/06* (2013.01)

(56) References Cited

U.S. PATENT DOCUMENTS

| | | | |
|---|---|---|---|
| 5,014,050 | A | 5/1991 | Lewiner et al. |
| 5,337,588 | A | 8/1994 | Chhatwal |
| 5,614,703 | A | 3/1997 | Martin et al. |
| 5,898,904 | A | 4/1999 | Wang |
| 5,990,885 | A | 11/1999 | Gopinath |
| 6,553,238 | B1 | 4/2003 | Ginzel et al. |
| 6,674,403 | B2 | 1/2004 | Gray et al. |
| 6,772,331 | B1 | 8/2004 | Hind et al. |
| 6,900,603 | B1 | 5/2005 | Del Vecchio |
| 7,012,503 | B2 | 3/2006 | Nielsen |
| 7,039,435 | B2 | 5/2006 | McDowell et al. |
| 7,114,178 | B2 | 9/2006 | Dent et al. |
| 7,315,823 | B2 | 1/2008 | Brondrup |
| 7,315,824 | B2 | 1/2008 | Chen et al. |
| 7,403,743 | B2 | 7/2008 | Welch |
| 7,565,411 | B1 | 7/2009 | Turcotte |
| 7,769,394 | B1 | 8/2010 | Zhu |
| 7,953,392 | B2 | 5/2011 | Karstens |
| 8,674,829 | B2 * | 3/2014 | Karam .................. G08B 25/10 340/539.23 |
| 2002/0055879 | A1 | 5/2002 | Wengrovitz et al. |
| 2002/0099945 | A1 | 7/2002 | McLintock |
| 2002/0183008 | A1 | 12/2002 | Menard et al. |
| 2003/0023463 | A1 | 1/2003 | Dombroski et al. |
| 2003/0064732 | A1 | 4/2003 | McDowell et al. |
| 2003/0118237 | A1 | 6/2003 | Laird |
| 2003/0149576 | A1 | 8/2003 | Sunyich |
| 2003/0208386 | A1 | 11/2003 | Brondrup |
| 2004/0059815 | A1 | 3/2004 | Buckingham et al. |
| 2005/0051620 | A1 | 3/2005 | DiLuoffo et al. |
| 2005/0094610 | A1 | 5/2005 | de Clerq et al. |
| 2005/0210283 | A1 | 9/2005 | Kato |
| 2005/0241003 | A1 | 10/2005 | Sweeney et al. |
| 2005/0261833 | A1 | 11/2005 | Brosius et al. |
| 2006/0056353 | A1 | 3/2006 | McBride |
| 2006/0106930 | A1 | 5/2006 | Shaffer |
| 2006/0116127 | A1 | 6/2006 | Wilhoite et al. |
| 2006/0152336 | A1 | 7/2006 | Turkovich, Jr. et al. |
| 2006/0154687 | A1 | 7/2006 | McDowell et al. |
| 2006/0164205 | A1 | 7/2006 | Buckingham |
| 2006/0183462 | A1 | 8/2006 | Kolehmainen |
| 2006/0187034 | A1 | 8/2006 | Styers et al. |
| 2007/0176739 | A1 | 8/2007 | Raheman |
| 2008/0137631 | A1 | 6/2008 | de Clerq et al. |
| 2008/0176580 | A1 | 7/2008 | Dery |
| 2008/0209521 | A1 * | 8/2008 | Malaney ............ H04L 63/0492 726/4 |
| 2008/0214209 | A1 | 9/2008 | Ratnakar |
| 2008/0221862 | A1 | 9/2008 | Guo et al. |
| 2008/0301580 | A1 | 12/2008 | Hjelmeland Alams et al. |
| 2009/0066476 | A1 | 3/2009 | Raheman |
| 2009/0093234 | A1 | 4/2009 | Cai et al. |
| 2009/0119698 | A1 | 5/2009 | Kuijlaars |
| 2009/0261965 | A1 | 10/2009 | Cum |
| 2009/0299777 | A1 | 12/2009 | Silberman |
| 2009/0313046 | A1 | 12/2009 | Badgett et al. |
| 2010/0057501 | A1 | 3/2010 | Mohammed |
| 2011/0102131 | A1 | 5/2011 | de Clerq et al. |

FOREIGN PATENT DOCUMENTS

| | | |
|---|---|---|
| JP | 2002013324 A | 1/2002 |
| JP | 2003/138816 | 5/2003 |
| KR | 10-2006-0088613 | 8/2006 |

\* cited by examiner

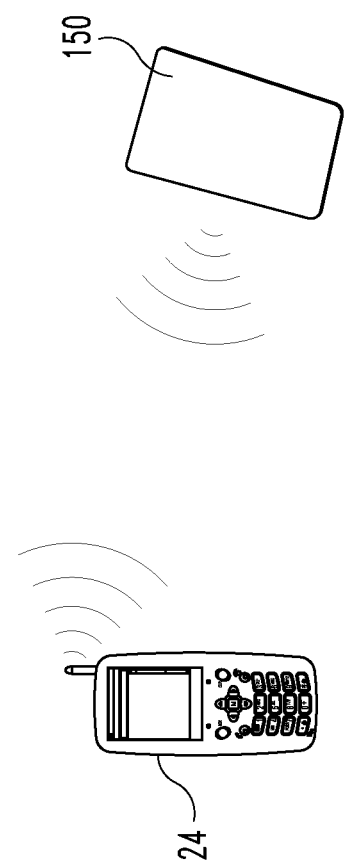

SYSTEM AND METHOD FOR ACCESSING A STRUCTURE USING A MOBILE DEVICE

CROSS REFERENCE TO RELATED APPLICATIONS

The present application is a continuation of U.S. patent application Ser. No. 14/307,667 filed Jun. 18, 2014 which is a continuation of U.S. patent application Ser. No. 12/536,103 filed Aug. 5, 2009 which is a continuation-in-part of U.S. patent application Ser. No. 12/368,601 filed Feb. 10, 2009, each of which is hereby incorporated by reference.

FIELD OF THE INVENTION

The present invention generally relates to an access system including a wireless user device and a proximity verification device. More particularly, the present invention pertains to an access system which receives a request for access from a user's mobile phone.

BACKGROUND

In the United States alone there are more than 4.5 million hotel rooms available to travelers. Currently, these hotel rooms have an industry-wide occupancy rate of just over 60%, with the occupancy rates of various geographic areas and individual hotels varying wildly. This occupancy rate often drastically affects the bottom line of a hotel or hotel chain. To increase their occupancy rate, and thus their profitability, hotels make every attempt to please their guests in order to encourage them to return. In order to please their guests, and lure new ones, hotels have continuously added amenities, such as on-site spas, restaurants, fitness centers, and in-room coffee machines or mini-bars.

In addition to these additional amenities, hotels have adopted a variety of different check-in procedures to minimize the time required for a guest to check-in. These procedures include adopting electronic key cards as opposed to mechanical keys, which enhances guest security and allows the hotel to change to a new room key, alleviating the need for the guest to return the keys to the front desk at check-out. However, even these procedures still present a distracting delay to a hotel's most valuable customers, business travelers. To increase loyalty amongst these frequent travelers, among others, most major hotel chains have invested tremendous assets in developing rewards programs, such as the Hilton HHonors® Program. The goal of these programs is to allow hotel chains to better understand the needs of travelers and make their stay as streamlined as possible. For instance, some hotels provide express check-in for a select set of their guests, while others provide check-in/check-out over the Internet or via a computer kiosk located in the hotel lobby. While these advances have certainly increased the occupancy rates of the various major hotel chains, they have not yet solved the problem of fully automating the guest check-in/check-out process, thereby allowing a guest to arrive at their hotel and enter their room without any additional time-consuming steps.

BRIEF DESCRIPTION OF THE DRAWINGS

FIG. 4 is a diagrammatic view of a token suitable for use in one embodiment of the present invention.

DETAILED DESCRIPTION

Figure 1:
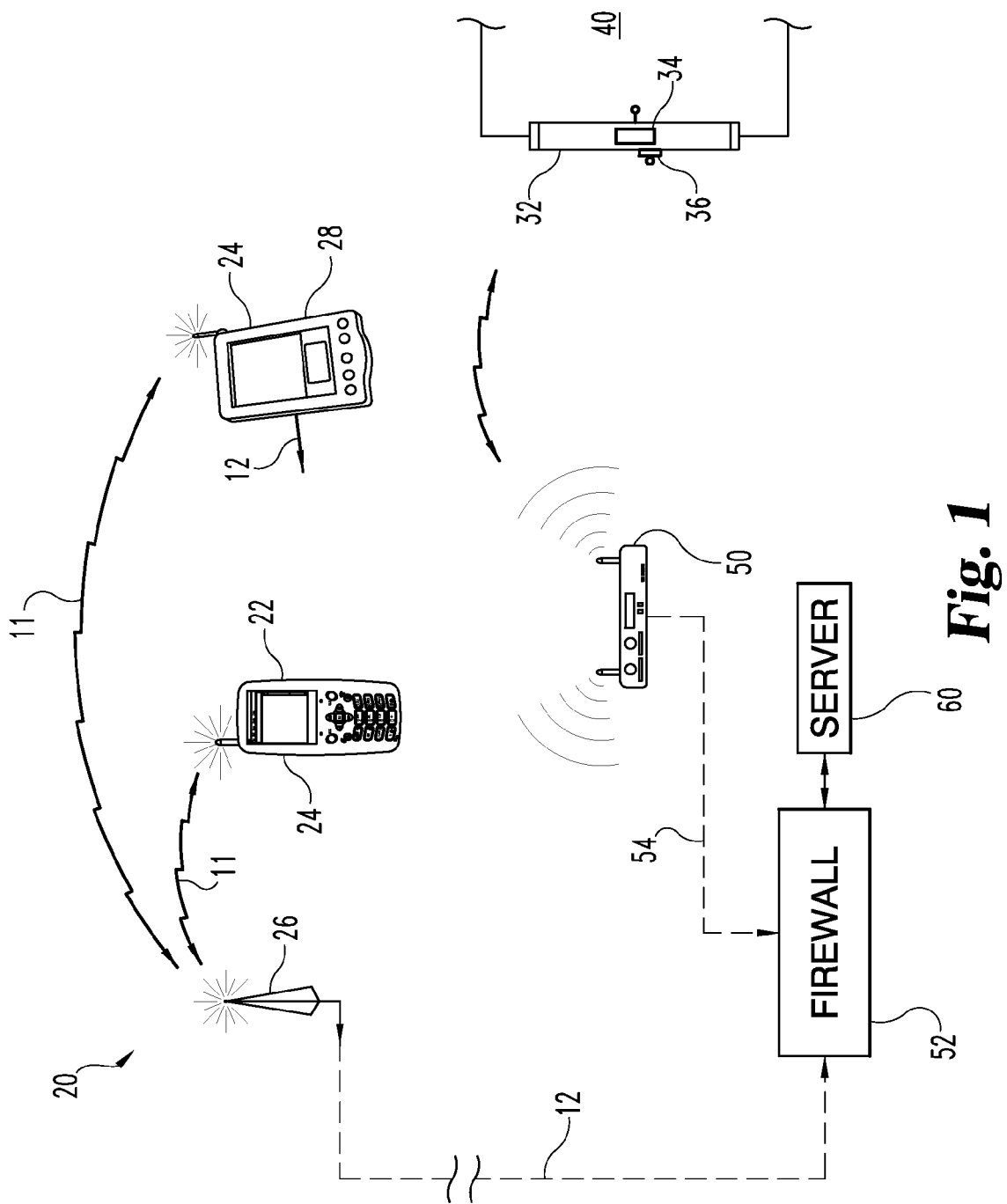
FIG. 1 is a diagrammatic view of an access system according to one implementation of the present invention.

For the purposes of promoting and understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Currently, systems exist, such as the Signature RFID/NFC system from VingCard, which provide a user access to a hotel room using their mobile phone. However, such systems all require a specialized transceiver within the door of the hotel room and the user's mobile phone such that the two may communicate using a short-range wireless technology. Only a slight fraction of existing mobile phones are currently capable of being used with such systems, and it may be quite some time before such technology is common, if ever.

Other technologies exist for remotely allowing a user to monitor and control the open or closed state of an entryway, such as a garage door, using a cell phone connected to a controller over the Internet. However, these technologies do not provide sufficient security as they are designed for purposes other than secure access control. For example, these systems allow a user to send a command to open a door from any location where they have Internet access. However, their unlimited availability also introduces several significant vulnerabilities to unauthorized access. As such, many problems exist in the prior art which are solved by the secure access system of the present invention.

As shown in FIG. 1, one embodiment of an access system 20 advantageously permits a user to access a structure 40 using a wireless device 24. In addition to lodging and workplace access systems, it will be appreciated that similar embodiments of the access system to be described also encompass systems for controlling access to other structures or openings/doors thereof. In the illustrated embodiment, according to FIG. 1, the described system comprises an access system 20 for allowing a hotel guest to access their assigned hotel room 40 using a wireless device 24, which in the preferred form, is the user's Bluetooth® capable cell phone 22 or other wireless appliance 28. As such, it will be understood that many of the descriptions herein with respect to a hotel environment and the like are meant for illustrative purposes and that the concepts herein are generally applicable to a general safety and security access system and are not limited to only a hotel room access system.

Examples of other structures for which the novel access system may be adapted include other rooms within a hotel (i.e. workout rooms, pools, VIP lounges), office buildings, school/university buildings, warehouses, and portions thereof, event ticket gates/turnstiles, movie theatres, safety deposit boxes, mailboxes, lockers, or other enclosures for which providing selective user access is desired.

Additionally, as explained later, access system 20 may also provide the user with various features including, but not limited to, automated check-in/check-out via an electronic kiosk or their wireless device, access to restricted members-only areas or lounges, and the like. Other features of access system 20 include the ability to request various reports on activity relating to the entry of various structures. Illustratively, some embodiments of the access system 20 allow the system to provide an activity log that reports the access requests during a specified period of time or for a specified user.

As shown in FIG. 1, according to the illustrative embodiment, the access system 20 interfaces with one or more wireless devices 24, such as cell phone 22 or wireless appliance 28, to allow a user to access their assigned hotel room. Cell phone 22 is preferably a mobile phone used for mobile voice or data communication over a network of cell towers. In addition to the standard voice function of a mobile phone, cell phone 22 preferably supports many additional services, and accessories, such as SMS for text messaging, email, packet switching for access to the Internet, Bluetooth, infrared, and GPS.

Illustratively, in some embodiments, the access system 20 is operably coupled to data network 12. Data network 12 is preferably the Internet, which is a TCP/IP based global network; however, the user of the term "Internet" herein shall be understood to refer to at least a portion of any public interconnected electronic network which interchanges data by packet-switching.

More specifically, access system 20 may utilize cellular phone network 11 and data network 12 to interface with a wireless device 24, such as cell phone 22. Cellular phone network 11 may comprise a variety of communication networks, including without limitation the universal mobile telecommunications system (UTMS), global system for mobile communication (GSM), and a code division of multiple access (CDMA) network, or similar technology. Cellular phone network 11 utilizes cell tower 26 to establish a wireless bi-directional transmission link between data network 12 and cell phone 22, which may comprise a wireless data link, such as the Evolution-Data Optimized (EVDO), Enhanced Data rates for GSM Evolution (EDGE), 3G, 4G, LTE, WiMax, or other wireless data connection. Similarly, other wireless appliances 28, such as Palm, Samsung, and Motorola smartphones or other portable wireless appliances such an the iPod Touch or Microsoft Zune may be configured to connect to access system 20 through access node 50 to allow a user to access their hotel room.

Alternatively, or additionally, access system 20 utilizes at least one access node 50 to interface with wireless device 24. Access node 50 is a wireless node implementing a short-range wireless standard, such as Bluetooth®, which once paired with, provides access to the Internet and data network 12 to wireless device 24 via internal network 54, in addition to server 60. Additionally, in a further form, access node 50 preferably broadcasts a wireless signal, implementing a wireless local area network, such as 802.11 a/b/g/n or the like thereby providing Internet connectivity via a traditional wireless network to hotel guests. According to the illustrative embodiment, access node 50 broadcasts information which is linked to the location of the user device over one or both of its short-range wireless signals to wireless device 24.

In the illustrative form, access system 20 includes a plurality of access nodes, such as access node 50, where each node is strategically positioned near a specified structure (i.e. a hotel room). The access nodes are preferably always in a discoverable mode so that wireless devices 24 may be paired with them on demand in the event the wireless device 24 is authorized, such as by having an authorized MAC address. In a further form, the access nodes are not in a discoverable mode and the pairing of the access nodes with wireless device 24 occurs prior to the user's arrival programmatically. Illustratively, in some embodiments, access node 50 is operatively connected to server 60 to process and authenticate electronic unlock requests from wireless devices 24. Firewall 52 includes at least a hardware or software implemented firewall or other selected security features to prevent external access to server 60 or access node 50.

The location information maintained by access node 50 is linked to the present/assigned location of the node and is used in processing any unlock request. For example, an access node on the fourth floor of a hotel in downtown Chicago may be assigned a unique hotel identifier coupled with a hotel zone identifier. Alternatively, the node may be assigned a single identifier which is then linked to its location by the wireless device 24 or server 60.

Access system 20 additionally comprises a mechanical lock 34 for locking and unlocking a structure 40 (partially shown). In the illustrated embodiment, a user gains access to the structure 40 via door 32. In the illustrative embodiment, mechanical lock 34 is a mechanical door lock, which includes a locking mechanism similar to a common entry or exterior lock, but is further capable of self-unlocking in response to an electronic signal. For purposes of non-limiting example, mechanical lock 34 may include a cam lock, rotary latch, electro-mechanical lock, magnetic lock, or the like. According to the preferred form, lock 34 unlocks in response to an electrical signal sent from an access node 50. In one form, the electrical signal is sent wirelessly, such as over a low-power RF connection, such as a Zigbee® connection. In a further preferred form, the lock 34 returns to a locked state following the passage of a predetermined time period or a user opening and closing the door following the receipt of an unlock signal. In some additional forms, lock 34 or door 40 may also include a mechanical key slot, key card, or other entry permitting authentication means 36 in addition to, or as backup for, that described herein with respect to lock 34. In addition, it shall be appreciated that system 20 may be applied to access restrictions other than locks including, for example, an elevator control system providing limited access, a garage door, or others access barriers, as described later.

According to the illustrated embodiment, server 60 operates to receive unlock requests from access node 50 over internal network 54. In one form, the server 60 serves to authenticate the request or a portion thereof using a reservations and occupancy database, while in other forms, the access node 50 may perform at least a portion of the authentication. In the illustrative embodiment, server 60 processes each request corresponding to an unlock request received by access node 50 from wireless device 24, and upon proper authentication, confirms the granting of the request to access node 50 which then transmits an electronic signal to the corresponding lock, such as lock 34, permitting access to the structure 40. While server 60 is described and illustrated as being a server, it should be understood that server 60 may be any computer, including a client server arrangement. Server 60 may interface with access node 50 by either a wireless or hardwired interconnection. Preferably, the connection is a secured connection. A non-limiting example list of potential interfaces includes IR, optical, RF, serial port, IP network, and USB. Additionally, the functions of server 60 and access node 50 may be integrated into one computer system.

In one form, access node 50 is fixed at a single position, but in an alternate form, access node 50 may be moveable, such as located within an elevator, and include a floor detector, so that the node may broadcast information linked to the appropriate floor upon which it is currently located. In a further form, an access node 50 is fixed within an elevator and connected to the elevator control system to allow the wireless device to communicate floor authorization information to access node 50. As such, the wireless device 24 may broadcast a floor to which the user is authorized to access so that the user may select that floor. In a further form, the elevator may be automatically commanded to take the user to that floor by access node 50 or server 60. As such, the user is enabled to access the floor or may experience a touchless trip to the proper floor.

In still other embodiments, lock 34 is operably coupled to an override switch (not shown) having an access disable state. Asserting the override switch prevents the access system 20 from permitting access to corresponding structure 40. As one non-limiting example, the override switch may be asserted when a guest engages a deadbolt or bar latch within their hotel room. In some embodiments of the access system 20, the override switch is incorporated into an electronic control, not shown here, accessible to the user within structure 40.

A flowchart illustrating one set of steps performed in configuring a wireless device 24 for use in accessing a structure 40 according to one embodiment of the present invention is shown. The process involves a wireless device 24 and the various other components of access system 20. The following description is with continuing reference to access system 20 of FIG. 1. As shown in FIG. 1, the wireless device is cell phone 22; however, it is understood that other networked appliances are also intended. It shall be appreciated that while the process is described with respect to the reservation and check-in process common for a hotel and hotel room the novel access system could be adapted for application in various settings to provide for the same desired result. As such, the confirmation and check-in process may be replaced with an employee authorization process or the like depending upon the nature of the structure being utilized.

Figure 2:
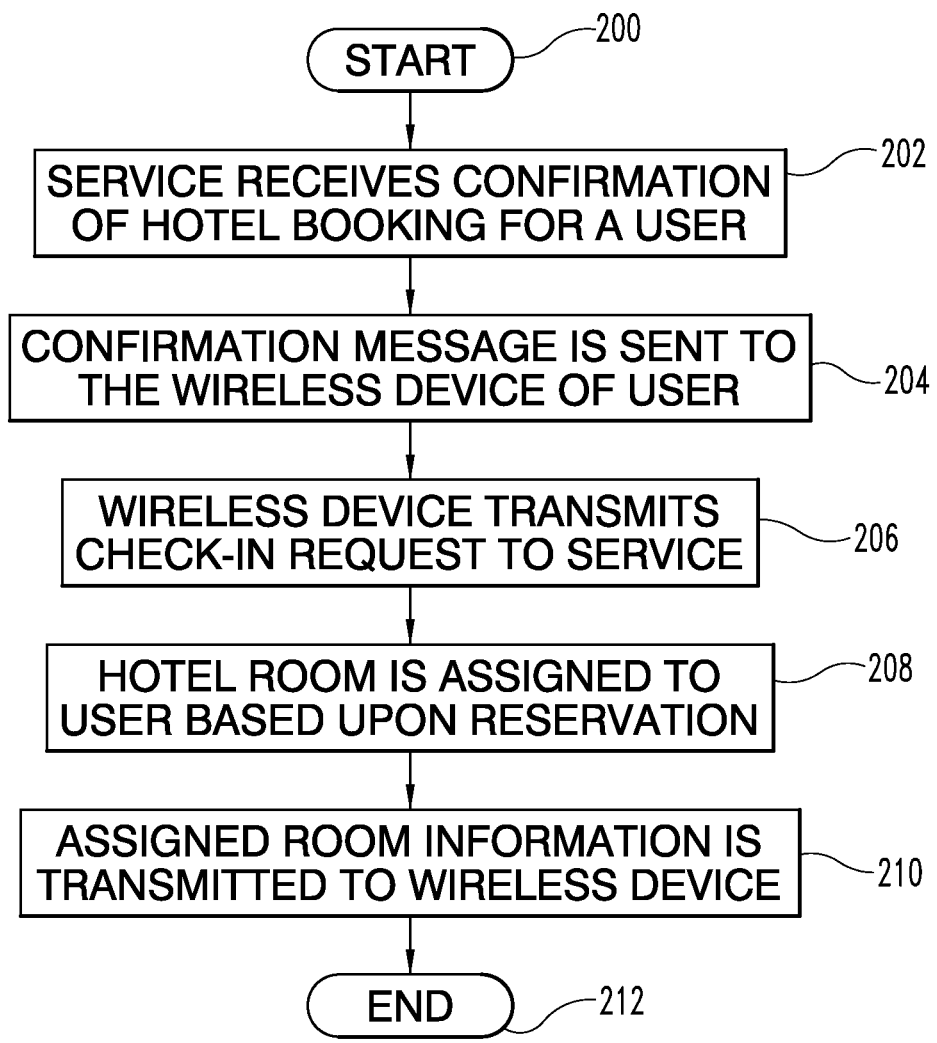
FIG. 2 is a process flow diagram illustrating one set of steps performed in enabling a user to access a structure using a wireless device and the novel access system.

As shown in FIG. 2, the process begins at start point 200 with the novel service receiving confirmation of the booking of a hotel stay for a user (stage 202). The confirmation information preferably identifies the hotel and the user and includes a check-in/check-out date along with details of the type of room requested/reserved. In the preferred form, this confirmation information is received by server 60 as a result of a hotel booking being made for a user either online, in person, or over the phone.

Subsequent to receiving the confirmation information, a confirmation message is sent to the wireless device 24 of the user (stage 204). Preferably, a phone number or email address corresponding to the user's wireless device is submitted along with the booking information. The confirmation message may be in the form of an e-mail, SMS, text message, or the like, sent over data network 12. The confirmation message includes a hotel identifier, user identifier, and an access string. In the illustrated embodiment, the confirmation message is handled by an installable application on the user's wireless device 24 which is available for install to the user, such as via the hotel website, a third-party website, other application source, or download source indicated in the confirmation message. Preferably, the application is suitable for operation on various mobile operating systems including Microsoft Mobile, Symbian OS, Palm OS, webOS, Mobile Linux, Apple OSX (iPhone), and MXI. In other forms, the application used by wireless device 24 may be browser-based and/or embedded software, to name a few non-limiting examples.

As a result of receiving the hotel identifier, the application will be able to retrieve access codes to enable wireless device 24 to automatically pair with access nodes at the appropriate hotel upon arrival. Preferably, those access codes will only be available the day of scheduled arrival or slightly before to prevent unauthorized access. In a further form, the pairing may be established automatically prior to the user and device 24 arriving at the hotel. In order to allow the user to access their room, a specific room must be assigned to the user. Traditionally, this has occurred either the day of check-in or during the check-in process. However, in the illustrative form, the user is assigned a specific room automatically prior to or upon arriving at the hotel. In one form, this occurs as a result of the wireless device 24 associated with the user transmitting a check-in request to wireless node 50 which is then sent to server 60 (stage 206). The check-in request is preferably triggered by the user's wireless device 24 connecting to an access node 50 within the hotel indicated by the hotel identifier of the confirmation message during the timeframe indicated by the check-in/checkout dates. Alternatively, the check-in request may be transmitted via an electronic kiosk in the hotel lobby, via the user device 24 over data network 12, or an actual in-person check-in entered by a hotel representative. It is preferred that the check-in request be sent over network 54 to server 60. In an alternate form, the check-in request may be sent over the Internet to server 60 without the user being present at the hotel.

Upon receiving a check-in request, access node 50 communicates with server 60 to confirm the dates and access string provided by the wireless device 24 and assign a room matching the reservation of the user (stage 208). In the preferred form, this is accomplished by server 60 which interfaces with the hotel's management system to store the appropriate access credential in an electronic database accessible to server 60. In addition, the server 60 associates a key code matching the user's confirmation message with the assigned room. In an alternate form, step 208 may be omitted and the access system 20 may simply automatically assign a room to the user, as described above with respect to step 208, on the day of check-in absent an indication of the user's presence at the hotel or the like.

The details of the assigned room, including its number and location, are then sent in a return message to the user's wireless device 24 by server 60 via access node 50 (stage 210). This enables the user to send an electronic request for access to the hotel room to access node 50 using wireless device 24. In one form, the MAC address of the wireless device 24 is transmitted along with the request for access, and this MAC address is similarly stored in the electronic database in association with the assigned room. The process ends at end point 212. It shall be appreciated that this process may be modified to accommodate more than one authorized hotel guest per room, such as having two wireless devices authorized to enter the same hotel room, or allowing a current guest to authorize the wireless device of another to access the hotel room for any portion of their remaining stay.

In continuing the description of the embodiment described with respect to FIG. 2, a flowchart illustrating one set of steps performed in allowing a user to access structure 40 using wireless device 24 and the various other components of access system 20 is shown. The following description is with continuing reference to access system 20 of FIG. 1 and the description accompanying FIG. 2.

Figure 3:
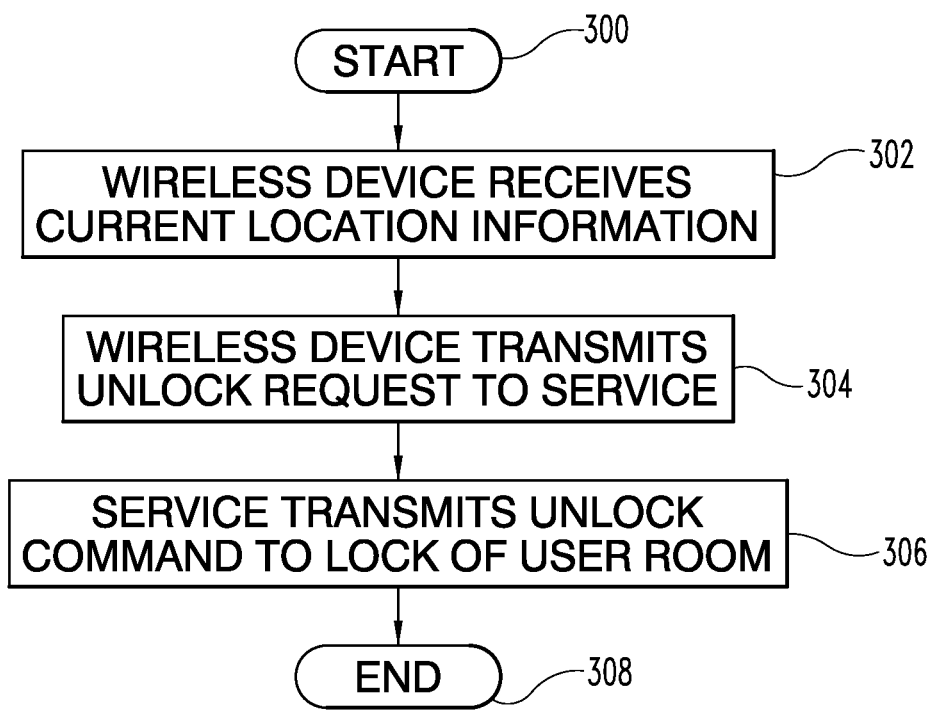
FIG. 3 is a process flow diagram illustrating one set of steps performed in providing access to structure to a user using a wireless device and the novel access system.

As shown in FIG. 3, the process begins at start point 300 with the wireless device 24 receiving location information linked to the current location of the user and wireless device 24 from access node 50 (stage 302). In one form, this location information is received or determined by wireless device 24 from access node 50 which is located near the user's assigned room (represented by structure 40). In the preferred form, access node 50 broadcasts a hotel identifier and a zone or area identifier which correspond to zones, such as floor, wings, or portions thereof in a hotel. In an alternate form, a unique identifier is sent along with a received unlock request by access node 50 which is then used as a lookup in a location table by wireless device 24 or by server 60. As a result, an added layer of security is provided by server 60 being configured to only authorize requests from access node 50 (which is an access node within range of the door requested to be unlocked) and subsequently authenticating those unlock requests received to confirm that the requesting wireless device 24 is authorized.

Depending upon the application, structure 40 may be within the broadcast range of access node 50, or the node 50 may be only located nearby, such as near the main elevator, stairway, hallway, or other essential entranceway. Once the wireless device 24 is within range of and is connected to access node 50, the wireless device 24 transmits an unlock request, which is received by access node 50 and passed on to server 60 (stage 304). Additionally, the access nodes 50 may be configured to require a predetermined signal strength prior to permitting an unlock request to be issued, to ensure that the user is in close proximity to the door which access is requested for. In the illustrated embodiment, this request is sent through internal network 54, but it shall be appreciated that the message may also be sent through another wireless network, such as 802.11 or another similar technology. The unlock request may include any of the following: hotel ID, room number, location information, user name, reservation number, check-in/check-out dates. In addition, other information may be included in the request.

In a still further form, the node 50 approximates the distance between itself and wireless device 24 using a signal strength determination. A zone may then be set (including a distance minimum or min/max range) which defines the distance the user along with wireless device 24 would be from the node 50 when in an acceptable vicinity of their assigned structure 40. If this determined distance does not match that set by the operator, then any unlock request send will not be authorized.

Once an unlock request is received by server 60, server 60 authenticates the MAC address of the wireless device as well as the validity of the current reservation and confirms the request with access node 50. Upon receiving this confirmation, access node 50 transmits an unlock command to the appropriate lock 34 using the Zigbee® connection (step 306). Upon receiving the unlock request, the lock then unlocks the structure and enables the user operating wireless device 24 to enter. The process ends at end point 308.

Turning to FIG. 4, a user node suitable for use in a further embodiment of the present invention is illustrated. User token 150 is device suitable for being queried by a wireless device 24. Token 150 is optionally provided to the user by the hotel or structure during authorization. Token 150 may include a coded unique identifier or some other verifiable data. Prior to sending any request, such as an unlock request, wireless device 24 may optionally be programmed to query for the presence of token 150 within its presence. In the event that a token 150 having the verifiable data is not found, then the request may be blocked. However, in the event the token 150 is within the proximity of wireless device 24 the request may be transmitted. As such, the user may be required to carry token 150 to ensure that wireless device 24 only functions with access system 20 when in the presence of the authorized user. According to this embodiment, token 150 is a passive Bluetooth node, but may be any other short-range wireless device, such as RFID or the like. Preferably, token 150 does not require its own power source.

In another form, access system 20 additionally comprises a parking access device (not shown) such as a garage door or parking gate coupled to lock control unit 42 selectively permitting access to a parking lot or structure (not shown). In this illustrated embodiment, a user is able to gain access to the parking area via the garage door or parking gate. According to the preferred form, the parking access device permits a user's vehicle access to the parking area in response to an electrical signal sent from a control device. In one form, the electrical signal is sent wirelessly.

In further systems, a proximity node, similar to node 50, may be included in other areas so as to permit a user to access structures, such as a hotel parking garage, based upon the confirmation information sent to their wireless device or other information as described herein. As such, the user's parking duration could be easily calculated and charged to their hotel bill.

In still further systems, a notification process may be executed by server 60 such that upon detecting a current hotel guest has left the hotel, a request for hospitality and cleaning services may be generated. In one form, the server 60 may detect a hotel guest leaving as a message sent from the user's wireless device upon passing by a access node located near the user's assigned room and another access node at one of the various exits to the hotel. Alternatively, the user opening the exit of the parking garage using their wireless device may trigger such a notification.

In yet another system, the wireless device may transmit information to server 60 upon passing an access node which indicates the user's entrance into the hotel or the area of their assigned hotel room. This information may trigger the in-room temperature to be raised to a user-specified or standard level or it may trigger the lights to be turned on, as described in U.S. patent application Ser. No. 10/126,486 to Sunyich entitled "Personalized Smart Room", which is hereby incorporated by reference to the extent not inconsistent.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

What is claimed is:

1. An access system allowing a user to access a structure using a wireless user device, the access system comprising:
   a database storing access permissions identifying at least one wireless user device authorized to access said structure and one access node authorized to permit access to said structure;
   a mechanical locking device securing a door of said structure, said locking device having a short-range wireless receiver suitable for receiving unlock commands and responding by unlocking said door;
   an access node, separate from said mechanical locking device and said door, positioned near said structure comprising:
      a first short-range wireless radio for receiving a wireless access request directly from a wireless user device and determining a received signal strength indication for said wireless user device; and
      a second short-range wireless radio for transmitting an unlock command to said mechanical locking device to permit access to said structure in response to receiving an authorized request; and a server operable to receive an unlock request associated with a wireless user device and a structure from said first short-range wireless radio of said access node and transmit an authorized request to said access node upon authorizing said unlock request using said database, wherein said unlock request is authorized only if received from an access node authorized to permit access to said structure and originating from a wireless user device authorized to access said structure and said received signal strength indication is above a predetermined threshold.

2. The access system according to claim 1, wherein said first short-range wireless radio is a Bluetooth radio.

3. The access system according to claim 1, wherein said wireless mobile device includes at least one access code for pairing with at least one access node.

4. The access system according to claim 1, wherein said first short-range wireless radio is an 802.11 radio.

5. The access system according to claim 1, wherein said second short-range wireless radio is a ZigBee radio.

6. The access system according to claim 1, wherein said short-range wireless receiver is a ZigBee receiver.

7. The access system according to claim 2, wherein said second short-range wireless radio is a ZigBee radio.

8. The access system according to claim 7, wherein said mechanical locking device is located within the transmission range of said second short-range wireless device.

9. The access system according to claim 8, wherein said mechanical locking device is located within the transmission range of said first short-range wireless device.

10. The access system according to claim 1, wherein said wireless user device is a mobile telephone.

11. The access system according to claim 2, wherein said wireless user device is a mobile telephone.

12. The access system according to claim 11, wherein said wireless user device includes a Bluetooth radio.

13. The access system according to claim 1, wherein said wireless user device is a personal digital assistant (PDA).

14. The access system according to claim 1, wherein said structure is a hotel room.

15. The access system according to claim 1, wherein said wireless access request includes the MAC address of the wireless user device.

16. The access system according to claim 1, wherein said unlock request is authorized only if an access node authorized to permit access to said structure detects a signal strength from said user device falling within a predetermine range associated with said structure near the time a wireless access request is received.

* * * * *